United States Patent [19]
Covington

[11] Patent Number: 5,556,338
[45] Date of Patent: Sep. 17, 1996

[54] COTTON HARVESTER RECEPTACLE

[75] Inventor: Michael J. Covington, LaGrange, Ill.

[73] Assignee: Case Corporation, Racine, Wis.

[21] Appl. No.: 438,783

[22] Filed: May 11, 1995

[51] Int. Cl.$^6$ ............................ A01D 46/10; A01F 12/60
[52] U.S. Cl. ............................................ 460/119; 56/30
[58] Field of Search ................................ 460/119, 114, 460/115; 56/16.6, 28, 30; 298/11

[56] References Cited

U.S. PATENT DOCUMENTS

| | | | |
|---|---|---|---|
| 4,606,177 | 8/1986 | Schluetter | 56/28 X |
| 4,930,297 | 6/1990 | Schluetter | 56/28 X |
| 4,996,831 | 3/1991 | Pearson et al. | 56/16.6 |

*Primary Examiner*—Terry Lee Melius
*Attorney, Agent, or Firm*—Rudnick & Wolfe

[57] ABSTRACT

A cotton harvester including a lower basket portion and an upper basket portion telescopically received by and elevationally movable with respect to the lower basket portion between a raised field working position and a lowered storage or transport position. The upper basket portion of the receptacle defines a material inlet opening which, when the upper basket portion is in an elevated position, is in general registry with an outlet opening defined toward an upper end of duct or cotton material delivery system. The receptacle further includes a hood assembly that is mounted on the upper basket portion in the region of the material inlet opening for guiding cotton materials discharged from the duct structure into the receptacle. To allow the upper basket portion to be elevationally moved relative to the lower basket portion without having to change or alter the duct structure, the hood assembly is mounted for extended and retracted movement along a generally horizontal path of travel relative to the upper basket portion of the receptacle.

22 Claims, 7 Drawing Sheets

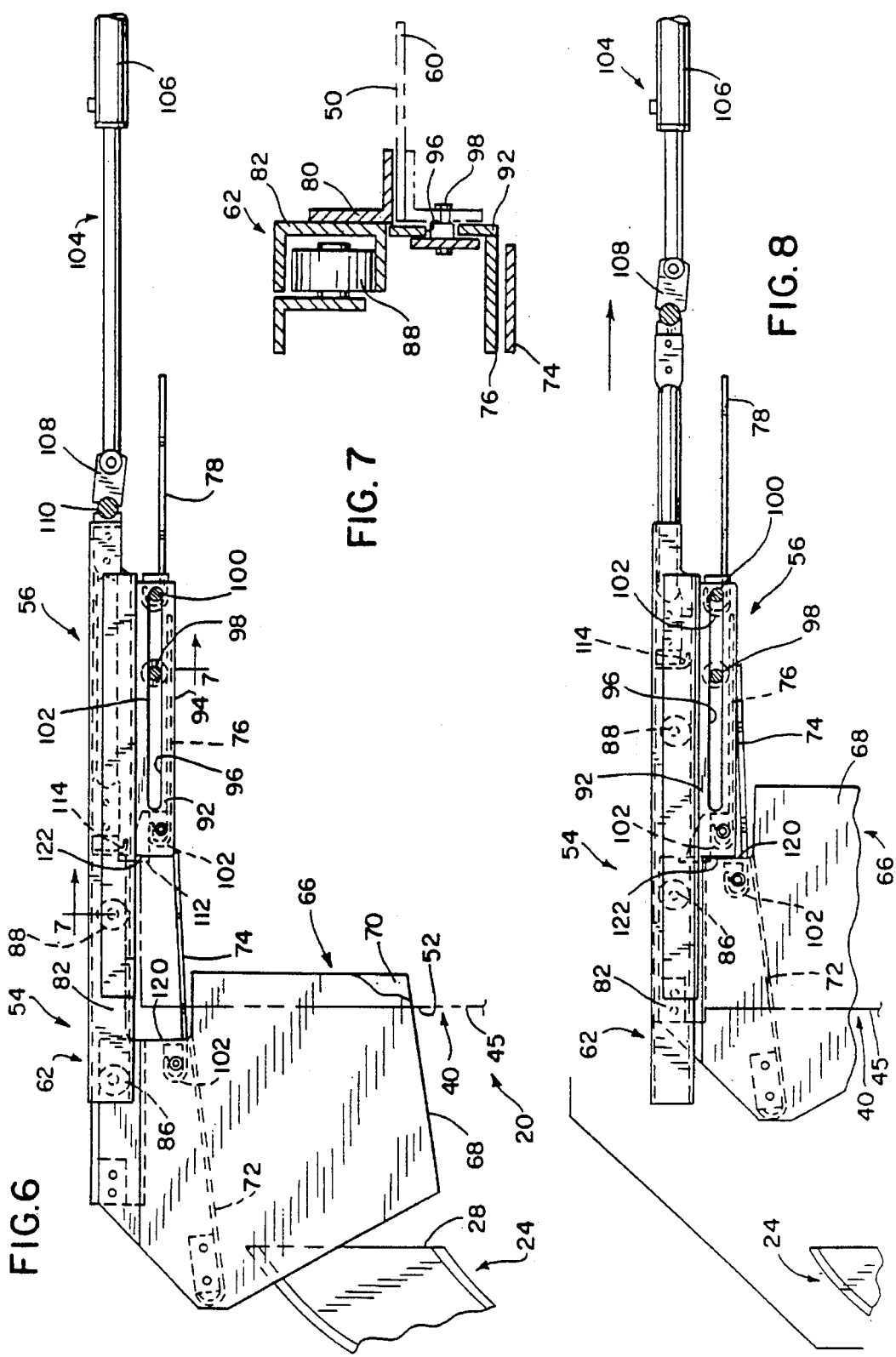

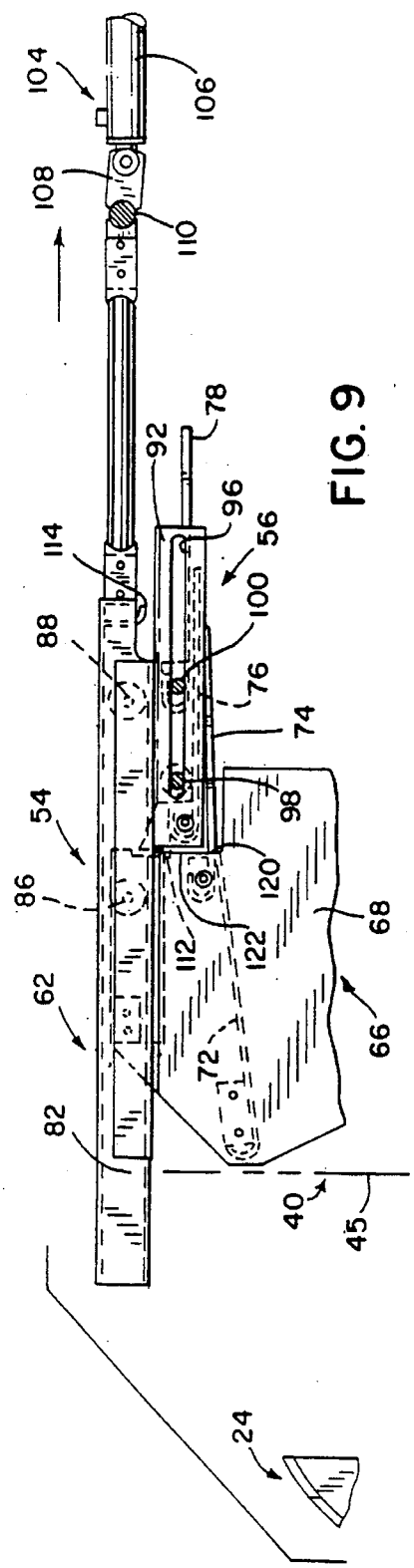
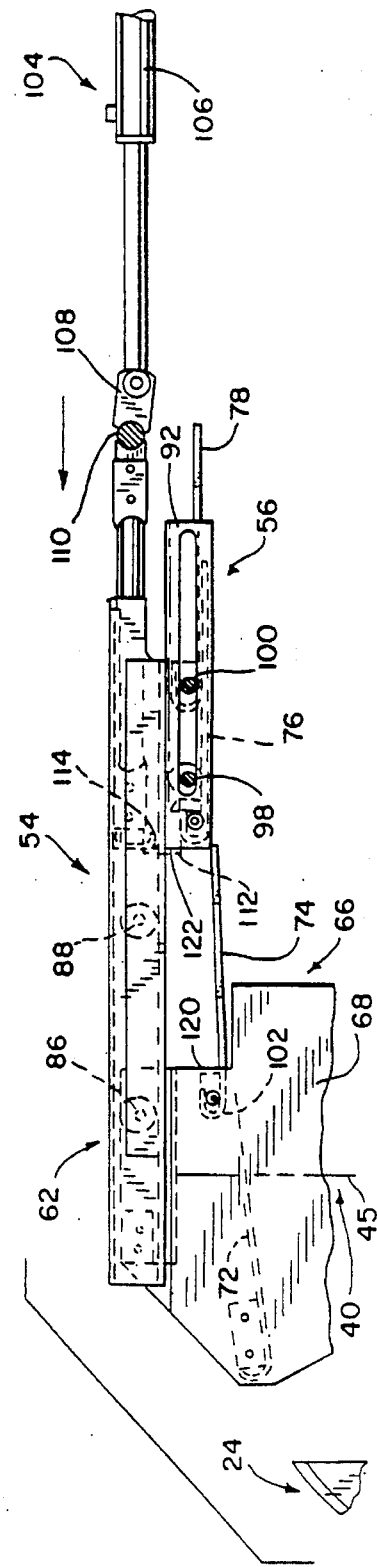

COTTON HARVESTER RECEPTACLE

FIELD OF THE INVENTION

The present invention generally relates to cotton harvesters and, more particularly, to a cotton harvester basket structure having an extendable/retractable upper basket portion with a hood assembly that serves to direct cotton into the basket structure from duct structure and which is slidably movable to allow the upper basket portion to be lowered without interfering with the duct structure to reduce the transport height of the harvester.

BACKGROUND OF THE INVENTION

Modem cotton harvesters include relatively large high volume receptacles that are mounted to the frame of the harvester for receiving and holding harvested cotton materials received from cotton harvester row units mounted on the frame. The receptacle typically includes a lower basket portion with an upper basket portion mounted thereon for elevational movement under the influence of drivers between a field working position and a retracted storage position.

A conventional cotton harvester further includes conveying duct structure that extends upwardly from the cotton harvesting row units mounted on the frame of the harvester. To optimize receptacle capacity, the cotton conveying duct structure extends to a top forward portion of the upper basket portion wherein one or more openings are provided that register with the cotton conveying structure. To promote the delivery of cotton from the duct structure into the receptacle, the upper basket portion includes a hood assembly that extends vertically over and partially about the discharge end of the duct structure. The hood assembly includes rigid hood structure that extends from the top forward portion of the basket. The hood assembly typically includes cleaning grate structure for allowing dirt, dust and debris blown from the duct structure along with the harvested cotton materials to be separated from the harvested cotton materials that are retained in the basket.

Although beneficially increasing the capacity of the receptacle, maintaining the upper basket portion in a field working position presents certain problems and drawbacks. Because of shipping size limitations, the upper basket portion must be moved to its retracted storage position when the harvester is freighted by rail or truck. Because of power lines and the like, the increased height of the receptacle provided with the upper basket portion in a raised field working position, makes it difficult to transport the harvester from one location to another. Moreover, the normal height of barn doors makes moving the harvester indoors for repairs or storage a problem because of the increased height added to the receptacle by the upper basket portion.

While the height of the duct structure can exceed the desired transportation height of the harvester, lowering the upper basket portion to a retracted position involves a significant amount of effort to disassemble portions of the receptacle. As mentioned, a portion of the hood structure of the hood assembly was arranged to extend over and surround the upper end of the duct structure. Accordingly, each hood structure comprising the hood assembly needs to be removed before the upper basket portion can be lowered to a retracted position. A customer, for example, who desires to transport his cotton harvester from one location to another must often spend a considerable number of man hours in tearing down and setting up the receptacle, thereby reducing the overall productivity of his harvester.

Thus, there is a need and a desire for a large capacity receptacle for a cotton harvester that is designed to accommodate shipping and transportation of the harvester and which obviates the need for tearing down and setting up the hood assembly in response to the position of the upper basket portion of the receptacle.

SUMMARY OF THE INVENTION

In view of the above, and in accordance with the present invention, there is provided a relatively large capacity receptacle for a cotton harvester. The receptacle of the present invention includes a lower basket portion that is mounted on a frame of the cotton harvester and an upper basket portion. The upper basket portion includes upright sidewalls and is elevationally arranged relative to the lower basket portion for vertical movement between an extended field working position and a retracted storage position. The upper basket portion defines a material inlet opening that is arranged in general registry with a material discharge opening defined toward an upper end of duct conventional structure that elevationally leads away from a plurality of harvesting row units mounted on the frame of the harvester. The receptacle of the present invention further includes a hood assembly that is mounted on the upper basket portion in the region of the material inlet opening for selective movement between extended and retracted positions to allow the upper basket portion to be elevationally retracted within the lower basket portion without having to manipulate the duct structure.

The hood assembly includes one or more hood structures that serve to guide cotton material between the discharge opening of the duct structure and the inlet opening of the upper basket portion. In those embodiments of the invention wherein more than one hood structure comprises the hood assembly, the hood structures are arranged in side-by-side relation relative to each other and extend over substantial lengthwise and widthwise portions of the top of the upper basket portion of the basket. Each hood structure is mounted on the upper basket portion of the receptacle for generally horizontal sliding movement between extended and retracted positions. Notably, when the hood structure is in a retracted position, the hood structure is disposedly spaced from the duct structure thereby allowing the upper basket portion to be lowered into its retracted storage position without interfering with the duct structure or without requiring any further manipulation of the duct structure to affect such ends.

In a preferred form of the invention, each hood structure is mounted on tracks for generally horizontal sliding movement relative to the upper basket portion. The hood assembly further includes a mechanism for interconnecting the hood structures to each other such that sliding movement of one hood structure likewise affect sliding movement of the hood structures connected thereto. In a most preferred form of the invention, the hood assembly further includes a motor for affecting powered movement of the hood assembly relative to the upper basket portion from a remote location such as a cab region of the harvester.

In a most preferred from of the invention, each hood structure comprising the hood assembly comprises a series of fore-and-aft extending panel members or cleaning grates that provide a degree of cleaning action as the cotton materials are blown from the duct structure. The cleaning grates or panel members of each hood structure are telescopically movable relative to each other to allow and in response to the hood assembly being moved to a collapsed or retracted position.

The cotton receiving receptacle of the present invention preferably includes structure for allowing the upper basket portion to telescopically move relative to the lower basket portion. Suitable lift motors are provided for elevationally moving the upper basket portion between its extended field working position thereby providing a relatively high cotton capacity for the receptacle and a lower or retracted storage position to facilitate transportation of the harvester from one field location to another.

An advantage of the present invention concerns the ability to move the hood assembly to a retracted position thereby allowing the upper basket portion to be moved to a retracted position without having to manipulate or disassemble the duct structure leading from the harvesting row units on the harvester. When a motor is used in combination with the hood assembly, the position of the hood assembly can be readily and easily affected through a switch from a convenient location on the harvester. Once the hood assembly is in a retracted position, the upper basket portion can be moved relatively quickly and easily with minimum operator involvement through the lift motors.

These and other objects, features and advantages of the present invention will become readily apparent to those skilled in the art from the description which follows and from the drawings.

BRIEF DESCRIPTION OF THE DRAWINGS

FIG. 6 is a schematic side elevational view of the hood structure illustrated in FIG. 5 in an extended position;

FIG. 7 is a sectional view taken along line 7—7 of FIG. 6;

FIG. 8 is a fragmentary side elevational view similar to FIG. 6 but showing partial retraction of the hood structure forming part of the hood assembly;

FIG. 9 is a fragmentary side elevational view similar to FIG. 8 but showing further retraction of the hood structure forming part of the hood assembly; and FIG. 10 is a view similar to FIG. 9 but showing initial extension of the hood structure toward an extended position.

DETAILED DESCRIPTION OF A PREFERRED EMBODIMENT

Figure 1:
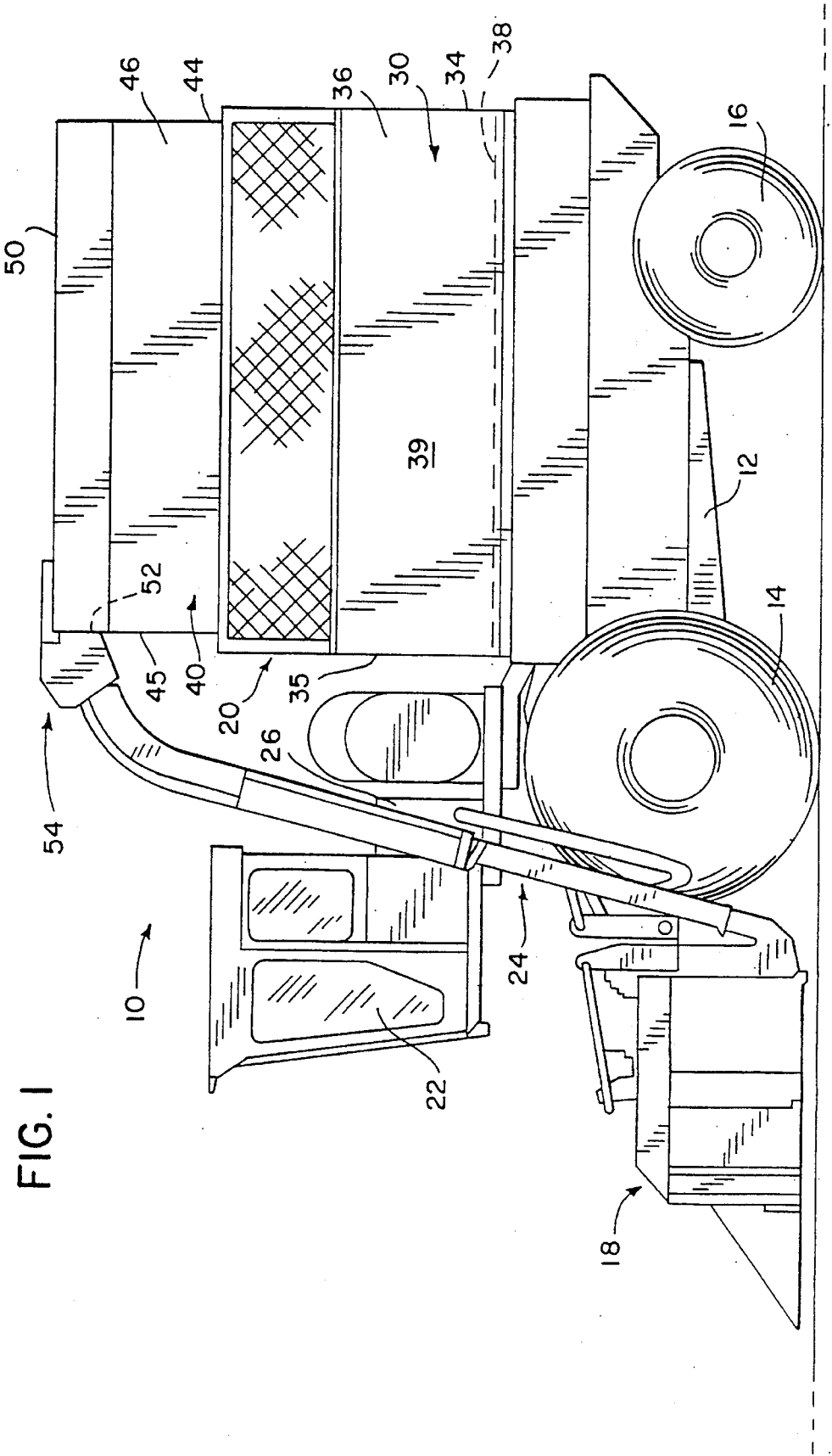
FIG. 1 is a side elevational view of a cotton harvester basket with a receptacle according to the present invention.

While the present invention is susceptible of embodiment in various forms, there is shown in the drawings a presently preferred embodiment herein after described, with the understanding that the present disclosure is to be considered as an exemplification of the invention and is not intended to limit the invention to the specific embodiment illustrated.

Figure 2:
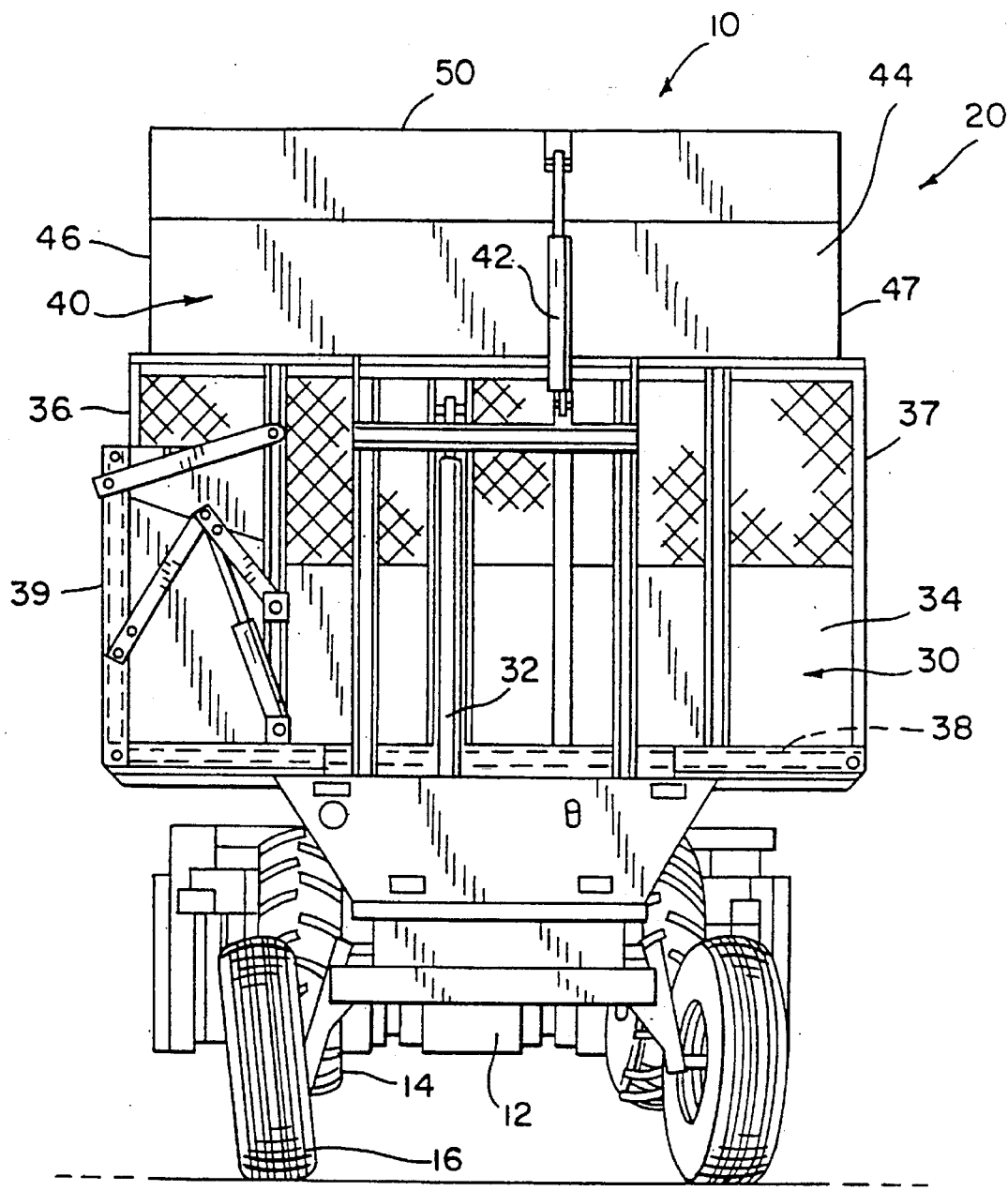
FIG. 2 is a rear perspective view of the cotton harvester shown in FIG. 1 with the cotton receptacle being shown in a field working position.

Referring now to the drawings, wherein like reference numerals refer to like parts throughout the several views, a cotton harvester is generally indicated in FIGS. 1 and 2 by reference numeral 10. Suffice it to say, cotton harvester 10 is of the type sold by Case Corporation of Racine, Wis. under Model No. 2100. More particularly, harvester 10 includes a self-propelled frame 12 supported on a pair of front drive wheels 14 and a pair of rear steerable wheels 16. Harvester 10 further includes a plurality of cotton harvesting units 18 mounted across the front of the harvester for picking or stripping cotton from rows of cotton plants as the harvester is driven through the field. As is conventional, the harvesting units 18 are supported in side-by-side relation relative to each other across a front end of the harvester 10. In the illustrated embodiment, a cotton receiving receptacle 20 is mounted on the frame 12 rearwardly of a driving compartment or cab 22. The compartment 22 is preferably configured as an enclosure for the operator and where the controls for operating the harvester are located.

As shown in FIG. 1, cotton material elevating or duct structure, generally designated by reference numeral 24, is operatively associated with and upwardly extends from the harvesting row units 18 for directing harvested cotton materials to the receptacle 20. In the illustrated embodiment, a conventional fan assembly 26 is arranged in combination with the duct structure 24. During operation of the harvester 10, the fan assembly 26 serves to draw harvested cotton materials into the duct structure 24 from the row units 18. The fan assembly 26 furthermore serves to forcibly propel the harvested cotton upwardly through the duct structure 24 toward a discharge opening 28 defined at a distal end of the duct structure 24. As it will be appreciated by those skilled in the art, one or more duct structures 24 may be associated with each harvesting unit 18. Moreover, and as shown in FIG. 1, an upper end portion of each duct structure 24 is conventionally slanted or otherwise rearwardly curved such that the discharge opening 28 is properly disposed or oriented in rearwardly facing relation to exhaust harvested materials into the receptacle 20.

As shown in FIGS. 1 and 2, receptacle 20 includes a lower basket portion 30 supported on and elevationally movable relative to frame 12 under the influence of front and rear preferably hydraulic basket lift cylinders 32 (with only the rear basket lift cylinder being shown in FIG. 2). The receptacle 20 further includes an upper basket portion 40 telescopically received by the lower basket portion 30. Front and rear preferably hydraulic telescoping cylinders 42 (with only the rear telescoping cylinder being shown in FIG. 2) elevationally position the upper basket portion 40 relative to the lower basket portion 30. As it would be appreciated by those skilled in the art, the upper basket portion 40 elevationally moves between a raised field working position (FIGS. 1 and 2) and a lowered transport position (FIGS. 3 and 4).

When the upper basket portion 40 of receptacle 20 is in a field working position (FIGS. 1 and 2), the capacity of the receptacle 20 is substantially increased. When the cotton harvester 10 is to be driven from one field location to another, or when placed for storage, the upper basket portion 40 of the receptacle 20 is positioned in its lower position to significantly reduce the overall height of the harvester and advantageously lower its center of gravity. The upper basket portion 40 of receptacle 20 may further include a cotton compactor (not shown). Furthermore, the lower basket portion 30 of receptacle 20 may further include cotton unloading structure (not shown) for promoting discharge of cotton materials from receptacle 20.

In the illustrated form of the invention, the lower basket portion 30 is a substantially rectangular open top structure including an aft end wall 34, a forward end wall 35, sidewalls 36 and 37, and a floor structure 38. In the illustrated embodiment, sidewall 36 includes a hinged or pivoted door 39 that is movable between the closed position shown in the drawings and an open position. In its open position, door 39 allows cotton materials to be discharged from the receptacle 20. In the preferred form of the invention, walls 34, 35, 36 and 37 of the lower basket portion 30 of receptacle 20 include, at least in part, metal screens fixedly supported on suitable frame work as well known in the industry.

Figure 3:
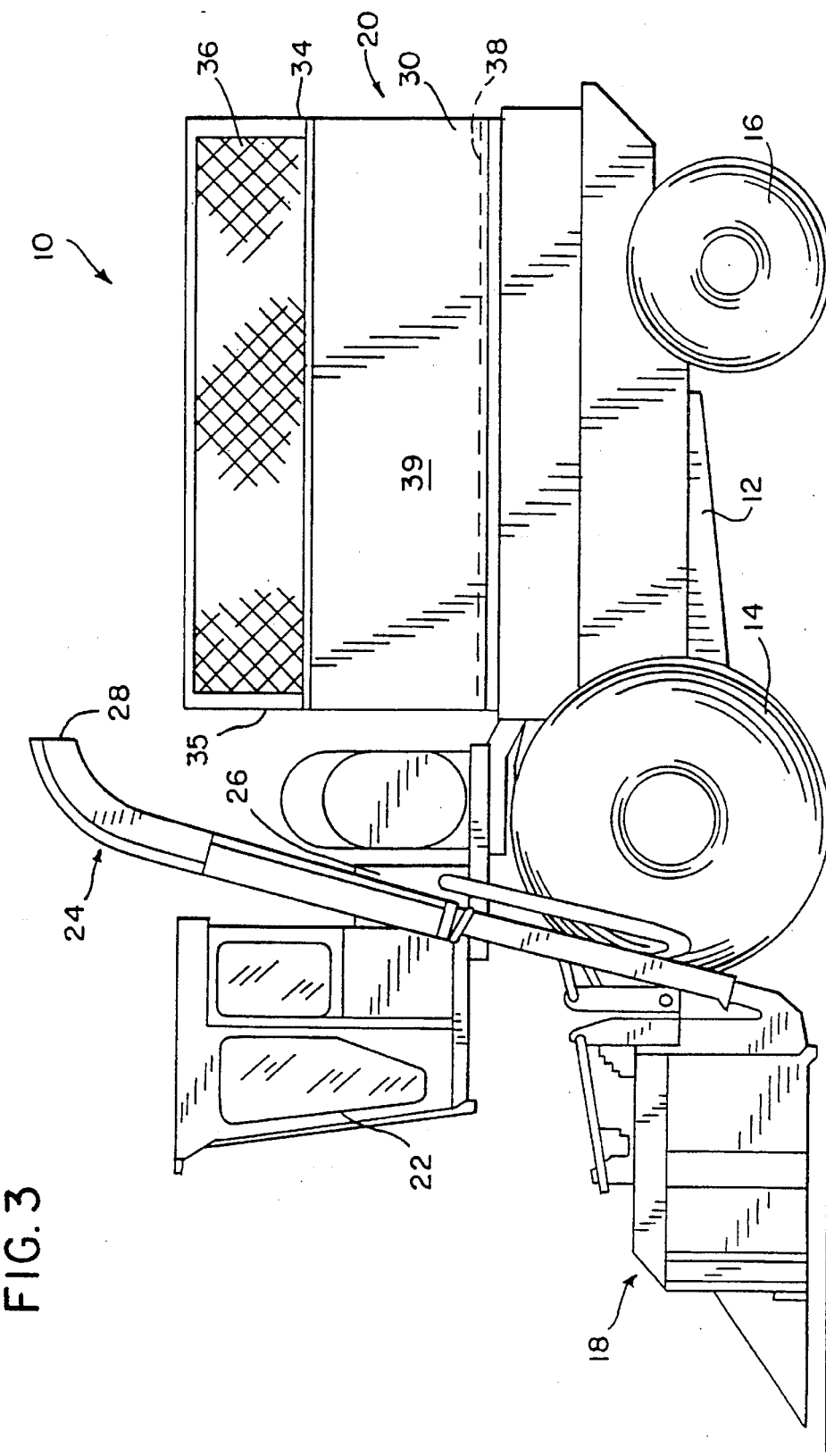
FIG. 3 is a side elevational view similar to FIG. 1 but showing an upper basket portion of the receptacle in a retracted storage position.
Figure 4:
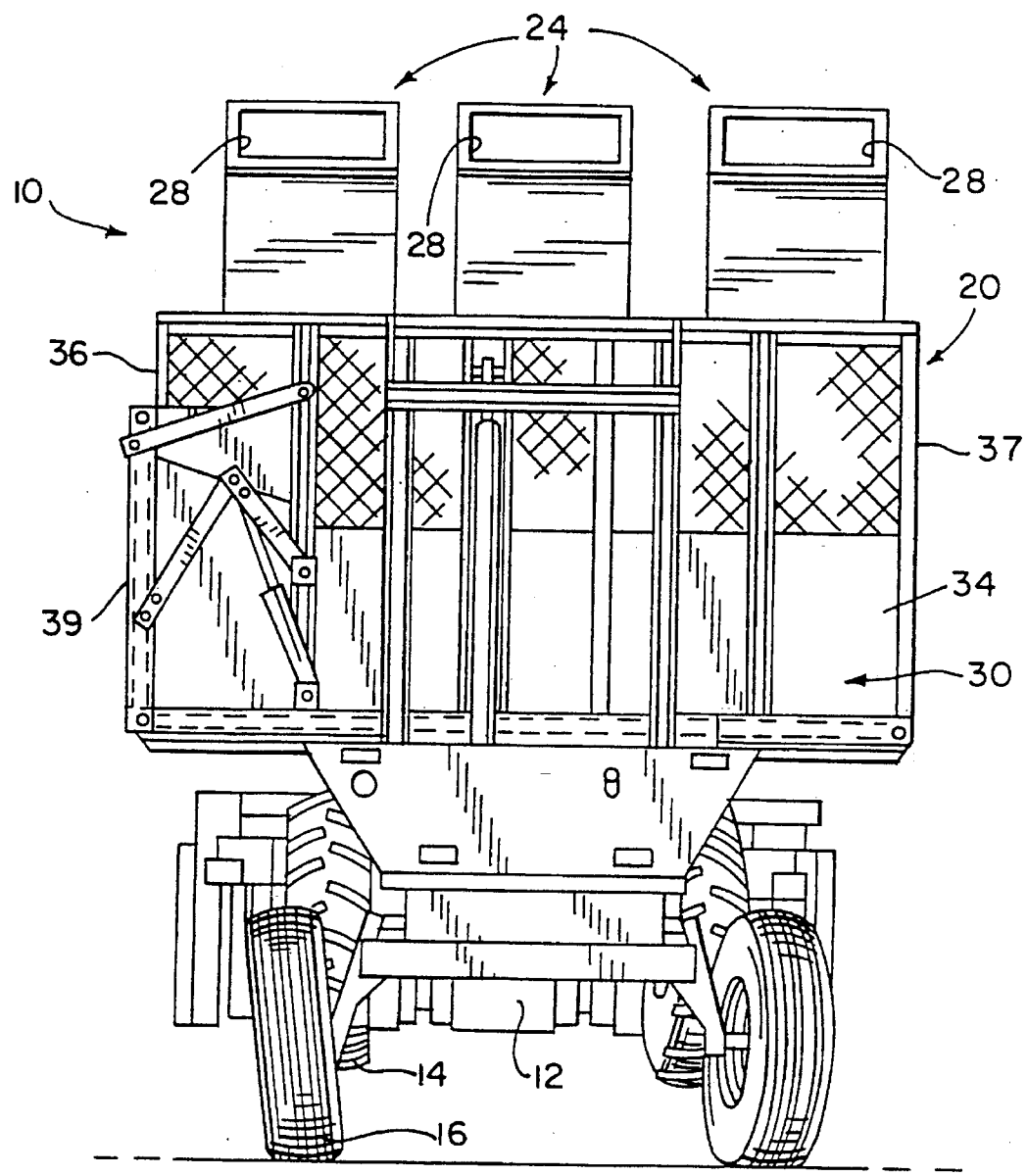
FIG. 4 is a rear perspective view similar to FIG. 2 but showing an upper basket portion of the cotton receiving receptacle in a retracted storage position.

The upper basket portion 40 of receptacle 20 has a shape which generally corresponds to the shape of the interior of the lower basket portion 30 and is telescopically received in the lower basket portion 30 of receptacle 20 for vertical movement with respect thereto between the raised field work in position (FIGS. 1 and 2) and a lowered transport position (FIGS. 3 and 4). The upper basket portion 40 includes a generally rectangularly shaped open bottom structure including an aft end wall 44, a forward end wall 45, and sidewalls 46 and 47. As is conventional, walls 44, 45, 46 and 47 of the upper basket portion 40 are formed, at least in part, from metal screens fixed supported on suitable framework well known in the art. The upper basket portion 40 of receptacle 20 further includes a top or cover structure 50 that serves to prevent cotton materials blown into receptacle 20 from inadvertently escaping through the top of the receptacle 20.

To optimize filling of receptacle 20, efficient and effective transfer of cotton materials from the duct structure 24 into the receptacle 20 is essential. In this regard, and as shown in FIG. 1, the discharge opening 28 of the duct structure 24 is configured to exhaust harvested cotton materials rearwardly and into the forward and upper portion of the receptacle 20. In this regard, the upper basket portion 40 of the receptacle 20 is provided with an inlet opening 52 defined toward the top of the forward or front wall 45 of the upper basket portion 40 in general registry with the discharge opening 28 of the duct structure 24 when the upper portion 40 is arranged in a field working position. To promote the transfer of cotton materials between the duct structure 24 and receptacle 20, the receptacle 20 of the present invention further includes a hood assembly 54 carried by the upper basket portion 40 of receptacle 20. The purpose of the hood assembly 54 is to guide cotton materials between the discharge opening 28 of the duct structure 24 and the inlet opening 52 in the upper basket portion 40 of the receptacle 20 while conjointly providing a degree of cleaning action to the harvested cotton materials.

As is typical, and as shown in FIG. 4, the duct structure 24 may comprise more than one vertically disposed tube or conduit extending from the harvesting units 18 toward the upper end of receptacle 20. In the illustrated embodiment, three enlarged duct structures 24 lead toward and open to the basket or receptacle 20. It should be appreciated, however, that duct or cotton material elevating structures more or less in number to that shown for exemplary purposes are equally within the spirit and scope of the present invention.

In this regard, and in the example illustrated, the hood assembly 54 includes three extendable/retractable hood structures 56 arranged in side-by-side relation relative to each other between the sidewalls 46 and 47 of the upper basket portion 40 of receptacle 20. In combination, the three hood structures comprising the hood assembly 54 comprise approximately one-half the length of the top or cover structure 50 of the upper portion 40 of the receptacle 20. The remaining length of the top or cover structure 50 of the upper portion 40 of receptacle 20 is comprised of a metal screen mesh that is attached to the sidewalls 46, 47 and the aft end wall 44 of the receptacle 20. Since the hood structures comprising the hood assembly 54 are substantially similar to each other, however, only one hood structure will be described in detail.

Figure 5:
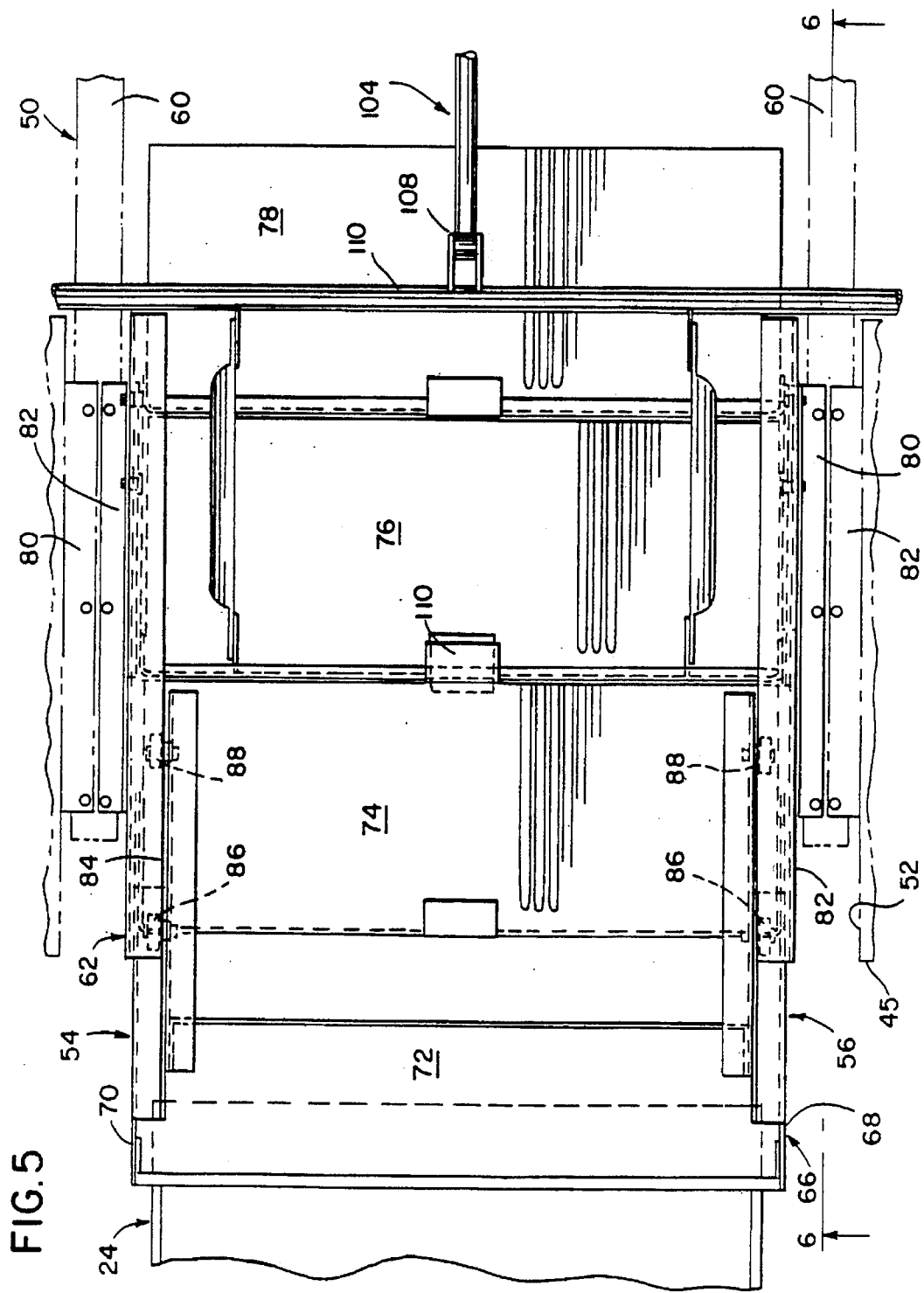
FIG. 5 is a fragmentary plan view of a hood structure forming part of a hood assembly arranged in combination with the cotton receiving receptacle.

As shown in FIG. 5, the top or cover structure 50 of the upper portion 40 of the receptacle 20 includes a series of parallel and transversely spaced fore-and-aft extending rigid and elongated supports 60. Each support 60 is rigidly connected to the rear and front walls 44 and 45, respectively, of the upper basket portion 40 of receptacle 20. Each hood structure 56 is disposed between two adjacent supports 60 on track structure 62 such that each hood structure 56 is limited to movement along a generally horizontal path of travel between an extended position (FIG. 6) and a retracted position (FIG. 9).

As shown in FIG. 5 and 6, and at a forward end thereof, each hood structure 56 of hood assembly 54 includes a hood 66 at that end normally arranged outside of the receptacle 20. In the embodiment illustrated, hood 66 comprises a pair of transversely spaced hood plates 68 and 70 disposed on opposite transverse sides of upper end of the respective duct structure 24 and a cover plate or member 72 that extends between hood plates 68 and 70. As shown, at least a portion of member 72 of each hood 66 extends vertically over at least a portion of the distal or discharge end of the respective duct structure 24 for guiding or directing cotton materials exhausted from the duct structure into the basket for receptacle 20. As will appreciated by those skilled in the art, and with the upper basket portion 40 in a raised position, the power lines and telephone wires that would otherwise slide along and, ultimately, pass over the distal ends of the duct structure tend to become entrapped between the duct structure 24 and that portion of the cover plate of member 72 of each hood 66 extending vertically over the duct structure resulting in or having a serious potential for significant problems.

In the illustrated embodiment, each hood structure 56 of the hood assembly 54 further includes a plurality of cleaning grates arranged in fore-and-aft relation relative to each other. In the most preferred form of the invention, each hood structure 56 includes a foremost cleaning grate 74, an intermediate cleaning grate 76 and a third cleaning grate 78. The grates 74, 76 and 78 are collapsible in a fore-and-aft relation relative to each other when the hood assembly 54 is moved to a retracted position. When extended relative to each other, the cleaning grates 74, 76 and 78 provide a perforated cover extending over the cotton materials entrance to the basket. That is, the cleaning grates 74, 76 and 78 combine to allow dust, dirt and debris blown from the discharge end of the conveying structure to pass therethrough while retaining the harvested cotton materials within the basket.

As shown in FIG. 5, a pair of transversely spaced side angles 80 and 82 served to mount a respective hood structure to adjacent supports 60 on the receptacle 20. As shown, the track structure 62 is attached to and carried by the fixed side angles 80 and 82. In the illustrated embodiment, track structure 62 comprises a pair of generally horizontal tracks 82 and 84. As shown, tracks 82 and 84 each accommodate a pair of fore-and-aft rollers 86 and 88 carried by hood 66 thus allowing for extension/retraction of hood 66 along the generally horizontal path of travel. As shown, the first cleaning grate 74 is connected to and extends rearwardly from the hood structure 66. Because the first cleaning grate 74 is carried by hood structure 66 it moves along a predetermined generally horizontal path of travel as the hood 66 moves between extended and retracted positions.

In the illustrated embodiment of the invention, and as shown in FIG. 6, track structure 62 further includes a pair of transversely spaced guide rails 92 and 94. As shown, each guide rail 92, 94 defines an elongated horizontal slot 96. Opposite ends of each slot 96 define limit stops to control horizontal movement of the second cleaning grate 76. Each guide rail 92, 94 is preferably supported for generally horizontal movement by a pair of fore-and-aft spaced stationary supports 98 and 100. As shown in FIG. 7, the supports 98, 100 are fastened in a suitable manner to the a respective support 60 and project through the elongated slot 96 in the guide rails 92 and 94. As shown, the second cleaning grate 76 is connected to and extends between the guide rails 92 and 94. As such, the second grate 76 is disposed for generally horizontal movement along a predetermined path of travel defined by slot 96. In the illustrated embodiment, the second cleaning grate 76 moves and extends generally parallel to and above the path of travel of the first cleaning grate 74.

The third cleaning grate 78 likewise extends between the guide rails 92 and 94 rearwardly of the second cleaning grate 76. In the illustrated embodiment, the third cleaning grate 78 is stationary and is preferably disposed above and generally parallel to the path of travel of the first and second cleaning grates 74 and 76, respectively.

As shown in FIG. 6, each of the cleaning grates 74, 76 and 78 preferably has a upturned forward end 102 that serves as a camming surface relative to a rearmost edge of an adjacent cleaning grate upon retraction of the hood assembly 52. As will be appreciated by those skilled in the art, any suitable configuration that serves as a camming surface will equally suffice to guide the cleaning grates 74, 76 and 78 in collapsible relation relative to each other.

Returning to FIG. 5, a single driver 104 is preferably used to extend and retract each hood structure of the hood assembly 52 simultaneously relative to each other. In the illustrated embodiment, driver 104 comprises a hydraulically actuated extendable/retractable cylinder 106 that is fixed to and carried by the receptacle 20. The operative end 108 of cylinder 106 is connected to an elongated actuator 110 extends transversely across and commonly connects the hood structures 56 of the hood assembly 54 to each other. As shown, the actuator 110 is connected to the first grate 74. As shown in FIGS. 5 and 6, connected to and intermediate the guide rails 92, 94 there is provided a grate grade catch angle 112. Moreover, a grate extender bar 114 is attached to and movable with the hood 66 of each hood structure 56.

During operation of the harvester 10, and is best shown in FIGS. 1 and 6, when the upper basket portion 40 is in a raised or field working position to maximize the capacity of receptacle 20, the cover plate 72 of each hood structure extends at least partially over the distal end of the duct structure 24. In such position, the hood plate 68 and 70 are disposed on opposite sides of the duct structure 24 to combine with the cover plate 72 to define a channel between the discharge opening 28 and the duct structure 24 and the inlet opening 52 to the receptacle 20 thus restricting movement of the cotton materials exhausted from the discharge opening 28 of the duct structure. The hood assembly 54, however, if left in the extended position shown in FIGS. 1 and 6, would interfere with the duct structure 24 when the upper basket portion 40 of receptacle 20 is telescopically lowered to its transport or storage position.

With the present invention, the hood assembly 54 can be retracted to a position whereby the hood assembly 52 is removed from interfering with the duct structure 24 thus allowing the upper basket portion 40 of the receptacle 20 to be readily moved to its transport or storage position without having to modify, manipulate or move any portion of the duct structure 24. As mentioned above, when the hood assembly 52 is to be removed to a retracted position, the operator actuates the driver 104 in a manner retracting the operative end 108 toward cylinder 106. Preferably, the driver 104 can be actuated from a remote location such as within a cab station of the harvester. As mentioned above, the operative end 108 of cylinder 106 is commonly connected to each of the hood structures 56 comprising the hood assembly 54, thus, retraction of the driver 104 will simultaneously effect retraction of each of the hood structures 56 from the position shown in FIG. 6 wherein the hood plates 68, 70 and cover plate 72 extend at least partially over and about the discharge end of the duct structures.

Retraction of the operative end 108 of the driver 104 will cause the hood plates 68, 70 and cover plate or member 72 to retract to the right as shown in FIGS. 6 and 8 whereby allowing the first grate 74 to move beneath and in stacked relationship relative to the intermediate grate 76. As will be appreciated, the track structure 62 will control the path of movement of the grates 74 and 76 during retraction and extension of the hood assembly 52. Retraction of the hood plates 68, 70 and cover member 72 along with grate 74 continues to the right until edge 120 on the hood plates 68 and 70 engage with an upstruck forward edge 122 on the guide rails 92 and 94.

As shown in FIG. 8, when edge 120 on the hood structure engages edge 122 of the guide rails 92 and 94, continued retraction of the driver 104 will cause simultaneous retraction of the grates 74 and 76 beneath the third grate 78. As will be appreciated, movement of the second grate 76 beneath the third grate 78 is controlled by the movement of the guide rails 92 and 94 along slot 96 that is supported on supports 98 and 100.

As shown in FIG. 9, movement of the first and second grates 74 and 76, respectively, beneath the third grate 78 is limited by the stop defined by the elongated slot 96 and the guide rails 92 and 94 and by the stroke of the cylinder 106. In this fully retracted position, shown in FIG. 9, the hood assembly 52 is adequately retracted within the upper basket portion 40 of receptacle 20 such that it is removed from interfering with the duct structure upon lowered telescopic movement of the upper basket portion 40 within the lower basket portion 30 of receptacle 20.

As noted above, the height of the duct structure 24 can exceed the desired transportation height of the harvester 10. With the upper basket portion 40 of the receptacle 20 in the lowered or transport position to facilitate transportation of the harvester as by lowering the center of gravity thereof, the rearwardly curved or slanted distal ends of the duct structure 24 allow the power lines and/or telephone lines to slidably move along and, ultimately, thereover. As will be appreciated, with the upper basket portion 40 in the lowered transport position, there is nothing to obstruct the power lines and other raised obstructions from merely passing over the duct structure and, thus, the height of the duct structure does not require manipulation when the upper basket portion 40 is lowered into the lower basket portion 30.

As will be appreciated, the hood assembly 52 remains in its retracted position as long as the upper basket portion 40 is nested or arranged within the lower basket portion 30. When it is desired to return the upper basket portion 40 to a field working position, the telescoping cylinders 42 are extended thereby elevationally moving the upper basket portion 40 relative to the lower basket portion 30. Because the hood structure 52 remains in its retracted position, however, there is no interference between movement of the upper basket portion 40 to its raised position and the duct structure 24.

After the upper basket portion 40 is positioned in its field working position, the hood assembly 52 can again be moved to its extended position. In the illustrated embodiment, movement of the hood assembly 52 to its extended position is again effected through operation of the driver 104. As mentioned above, operation of the driver 104 will simultaneously effect movement of each hood structure 56 associated with the hood assembly 54. Upon extension of the cylinder 106, the hood plates 68 and 70 and cover member 72 along with the first cleaner grate 74 will initially move to the left as shown in FIG. 10 independent of the guide rails 92, 94, intermediate grate 76. Movement of the hood plates 68, 70, cover member 72 and grate 74 will continue until the grate extender bar 114 engages the grate catch angle 112 extending upwardly form the second or intermediate grate 76. In a most preferred form of the invention, the movement of the first grate 74 toward its extended position will continue until the aft end of grate 74 is approximate to the fore end of grate 76.

After the first cleaner grate 74 has been moved to its extended position with respect to the second cleaner grate 76, further extension of the driver will cause the hood plates 68, 70, cover plate 72 grate 74 and grate 76 to all move together toward the left or extended position and out from under the third cleaner grate 78. As will be appreciated, the intermediate cleaner grate 76 is being pulled by the grate extender bar 112 catching on the grate catch angle 110.

Continued distention of the driver 106 causes the guide rails 92 and 94 of the track structure 62 to move along the path defined by the elongated slot 96 and supports 98 and 100. Distention of the driver 104 continues until the hood assembly 52 is returned to the position shown in FIG. 6. As such, the hood assembly 52 is returned to a position whereat it extends at least partially over and about the discharge opening of the duct structure 24. As such, the hood assembly 52 is positioned to control and guide the cotton materials exhausted from the duct structure into the receptacle 20 thereby minimizing the loss of cotton materials to the ground.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A receptacle for a cotton harvester having a main frame, harvesting structure for removing cotton materials from cotton plants, cotton material elevating structure operatively associated with and upwardly extending from the harvesting structure and having a discharge opening, and a receptacle for receiving cotton materials from the elevating structure, said receptacle comprising:

a basket for holding cotton materials received from the elevating structure, said basket including a lower basket portion mounted on the main frame, an upper basket portion telescopically received by the lower basket portion for vertical movement between an extended field working position and a retracted storage position, said upper basket portion defining an inlet opening, and an extendable/retractable hood assembly carried by the upper basket portion for guiding cotton materials between the discharge opening of the elevating structure and the inlet opening of said upper basket portion, with at least a portion of the hood assembly extending vertically over an upper end portion of the cotton material elevating structure when the hood assembly is in an extended position, and wherein when said hood assembly is moved to a retracted position the hood assembly is removed from interfering contact with the duct structure thereby allowing the upper basket portion to be lowered into its retracted storage position thus facilitating transportation and storage of the cotton harvester.

2. The receptacle according to claim 1 further including motors for effecting powered vertical movement of the upper basket portion relative to the lower basket portion.

3. The receptacle according to claim 1 wherein said hood assembly includes at least one hood, and structure for allowing said hood to slidably move to a retracted position relative to said upper basket portion.

4. The receptacle according to claim 3 wherein said hood assembly further includes a motor for effecting powered movement of the hood assembly relative to the upper basket portion.

5. The receptacle according to claim 1 wherein said hood assembly further includes at least two hood structures that are mounted for generally horizontal sliding movement relative to the upper basket portion of the basket, and wherein each hood structure comprises at least one member that extends above the distal end of the elevating structure for directing cotton materials into the basket.

6. The receptacle according to claim 5 wherein each hood structure comprises a series of grates that, in a first position, cover substantial lengthwise and widthwise portions of a top of the upper basket portion of the basket and which are movable to a second position wherein the grates are arranged in vertically nested relationship relative to each other in response to movement of the hood assembly to a retracted position.

7. A receptacle for a cotton harvester having a mobile support, harvesting structure for removing cotton materials from cotton plants, cotton material elevating structure extending upwardly from the harvesting structure and having a material discharge opening, said receptacle comprising:

a basket for holding cotton materials received from the elevating structure, said basket including a lower basket portion movably mounted on said support, an upper basket portion telescopically received by the lower basket portion for movement between an extended field working position and a retracted storage position under the influence of drivers, said upper basket portion defining a material inlet opening arranged toward an upper end of said basket, and a hood assembly slidably mounted on the upper basket portion for movement between extended and retracted positions, wherein when said hood assembly is in its extended position said hood assembly at least partially extends over and at least partly about the material discharge opening of said elevating structure to guide cotton materials exhausted from said elevating structure into said basket structure, and wherein when said hood assembly is in a retracted position the hood assembly is disposedly spaced from the material discharge opening thereby allowing the upper basket portion to be lowered into said retracted storage position without interfering with the elevating structure.

8. The cotton receptacle according to claim 7 wherein said upper basket portion comprises generally parallel from and rear upright walls rigidly joined to each other by a pair of opposed and generally side walls, and with a top wall joined to at least two of said walls for adding strength to the upper basket portion.

9. The receptacle according to claim 7 further including a motor for effecting powered movement of the hood assembly between said extended and retracted positions.

10. The receptacle according to claim 7 wherein said hood assembly comprises a pair of side-by-side hood structures, each hood structure including tracks on opposite sides thereof for guiding the respective hood for sliding movement between said extended and retracted positions.

11. The receptacle according to claim 10 wherein said hood assembly further includes a mechanism for interconnecting the hood structures to each other such that sliding movement of one hood structure effects sliding movement of all the hood structures.

12. The receptacle according to claim 9 wherein each hood structure comprises a series of fore-and-aft members that, in combination with each other, define substantial lengthwise and widthwise portions of the top of said upper basket portion of the basket and which are slidably movable in telescopic relation relative to each other in response to extension and retraction of the hood assembly.

13. A receptacle for a cotton harvester having a mobile support, harvesting structure for removing cotton materials from cotton plants, duct structure arranged in operative association with and extending upwardly from the harvesting structure, said duct structure having a material discharge opening at an upper end thereof, said receptacle comprising:

a basket for holding cotton materials received from the duct structure, said basket including a lower basket portion mounted on said support, an upper basket portion having upright sidewalls and which is elevationally arranged relative to the lower basket portion for movement between an extended field working position and a retracted storage position, said upper basket portion defining a material inlet opening arranged in general registry with the material discharge opening of said duct structure when said upper basket portion is in a field working position, and a hood assembly mounted on the upper basket portion in the region of the material inlet opening for guiding materials exhausted from the duct structure through the inlet opening and into the basket, and wherein said hood assembly is mounted for selective movement between extended and retracted positions.

14. The receptacle according to claim 13 wherein said basket further includes drivers for effecting powered vertical movement of the upper basket portion relative to the lower basket portion.

15. The receptacle according to claim 13 wherein said hood assembly comprises a hooded structure at least a portion of which extends vertically proximate to and over an upper end of the duct structure when said upper basket portion is in a field working position, and a mechanism for mounting the hooded structure for sliding movement.

16. The receptacle according to claim 13 further including a mechanism for mounting the hood assembly for generally horizontal sliding movement, and a driver for effecting powered sliding movement of the hood assembly between extended and retracted positions.

17. The receptacle according to claim 13 wherein said hood assembly includes at least two hood structures, each hood structure being mounted for generally horizontal movement relative to the upper basket portion.

18. The receptacle according to claim 17 wherein each hood structure comprises a series of panels extending over and across an upper portion of the upper basket portion of the basket, said panels being telescopically movable relative to each other in response to retracting and extending movements of the hood assembly.

19. A receptacle for a cotton harvester having a mobile frame, first and second harvesting row units mounted on said frame for removing cotton materials from rows of cotton plants, first and second cotton conveying duct structures operatively associated with said first and second row units, respectively, for directing cotton from said row units to a receptacle, wherein each duct structure extending upwardly and rearwardly from a respective row unit and defines a material outlet opening toward an upper end thereof, said receptacle comprising:

a basket for receiving and holding cotton materials delivered thereto by said first and second duct structures, said basket including a lower basket portion mounted on said frame, an upper basket portion carried by said lower basket portion for elevational movement between a field working position and a retracted storage position, said upper basket portion defining first and second material inlet openings that are arranged in general registration with the outlet openings of said first and second duct structures, respectively, when said upper basket portion is in a field working position whereby allowing cotton materials to be introduced into the basket from the duct structures, and wherein said first and second openings on the upper basket portion are in nonregistering relation relative to the material outlet openings of said duct structures when said upper basket portion is moved to a storage position, and a hood assembly arranged in operative association with the upper basket portion for guiding cotton materials between the material outlet openings of the duct structures and the material inlet openings of the upper basket portion, said hood assembly comprising first and second hood structures mounted on said upper basket portion and arranged in registry with said first and second material inlet openings, for movement between extended and retracted positions.

20. The receptacle according to claim 19 wherein each hood structure is mounted to said upper basket portion for generally horizontal sliding movement between extended and retracted positions.

21. The receptacle according to claim 19 wherein said hood assembly further includes a mechanism for joining said first and second hood structures to each other.

22. The receptacle according to claim 19 wherein said hood assembly further includes one driver for simultaneously moving said first and second hood structures between the extended and retracted positions.

* * * * *